CALL DISTRIBUTING CIRCUIT UTILIZING SEQUENTIAL ACTIVATION OF STATION RINGERS
Filed Oct. 17, 1966 2 Sheets-Sheet 1

INVENTORS D. A. MAC LEOD
G. P. MADDOCK
BY
R. A. McCorkendale
ATTORNEY

United States Patent Office 3,478,174
Patented Nov. 11, 1969

3,478,174

CALL DISTRIBUTING CIRCUIT UTILIZING SEQUENTIAL ACTIVATION OF STATION RINGERS

Donald A. MacLeod and George P. Maddock, Oakland, Calif., assignors to American Telephone and Telegraph Company, New York, N.Y., a corporation of New York Filed Oct. 17, 1966, Ser. No. 587,305
Int. Cl. H04m 3/42
U.S. Cl. 179—18 10 Claims

ABSTRACT OF THE DISCLOSURE

We disclose an arrangement for distributing calls among a group of telephone stations by the sequential enablement of the ringers at those stations. An incoming call causes the line lamps at all stations to flash but only one ringer is activated indicating the station to which the call should be distributed. After answering the call at a given station, that station's ringer is bypassed so that the next call causes the subsequent station ringer to be activated. In the event of simultaneous calls, one call is automatically advanced to cause ringing of a second station.

Figure 1:
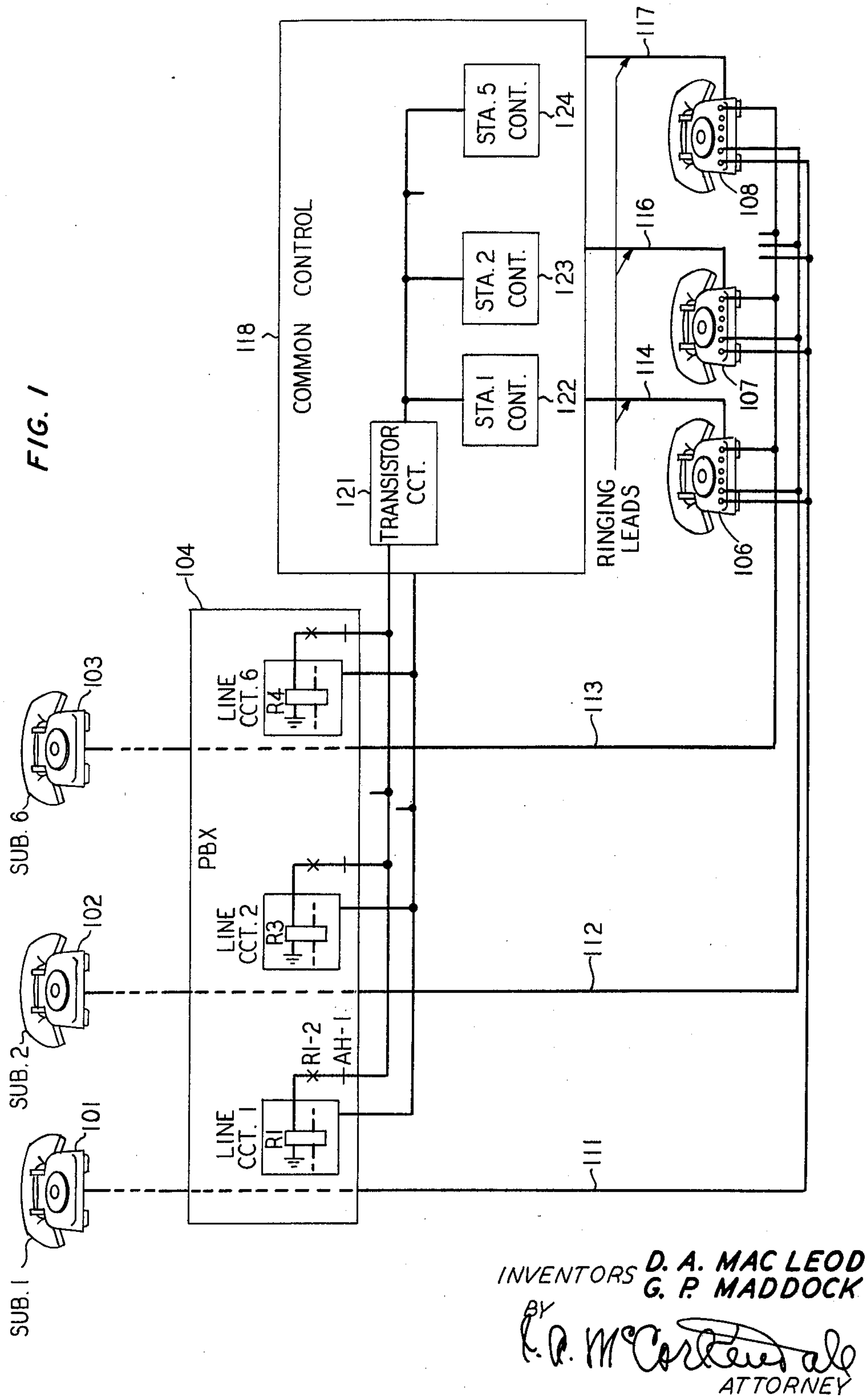

This invention relates to a call distributing circuit and more particularly to a call distributing circuit for use in distributing incoming calls to telephone station lines arranged in groups.

It is common practice, of course, in modern business institutions such as large department stores or financial houses to provide a group of information clerks for the purpose of answering telephoned inquiries from prospective customers. These calls may be received over a variety of types of lines, including local lines, toll lines, tie lines and the like, and may in some instances be directed to a common telephone number assigned to the institution and, in other instances, to one of several individual numbers assigned thereto. In order that all of the information clerks may share equally in the work load, an even, equitable distribution of incoming calls among all the station lines of the group is, of course, important.

Many of the call distributing arrangements known and used heretofore have not been entirely satisfactory in the above respect since the method of operation has involved scanning each group of lines in a predetermined order, for example from highest to lowest, each time a selection is to be made, the first idle line encountered in each scan being selected for the respective call. Obviously, those lines closest to the point at which the scan is started will be selected most often and the clerks serving those lines will have the heavier load. In periods of light traffic, particularly, the more remote lines of a group are apt to be selected relatively infrequently as compared with the higher lines of the group.

A more equitable distribution of the work load is attained through use of a recently developed type of call distributing circuit of the general nature disclosed in Patent 3,142,728 issued July 28, 1964 to D. A. MacLeod, since in accordance with that arrangement no station of a group is called upon to handle a second call until all stations of the group have handled their respective first calls. However, in the instance of certain sizes of installations the use of this type of circuit has appeared undesirable from a cost standpoint.

Accordingly, it is an object of our invention to improve the operation of call distributing circuits.

Another object of our invention is to provide call distributing facilities under favorable economic conditions.

A more specific object of our invention is the prevention of difficulties in the operation of a call distribution circuit resulting from a simultaneous call condition.

In accordance with a specific embodiment of our invention a plurality of telephone sets are provided in the answering group, each of the sets having a termination thereon of all the answerable lines for the group and each having a ringer or other call signal individual to the respective set. As a call is answered by a respective set a path is closed to the next set in the chain whereby the ringer of that next set is activated when the next call comes in. As a call is received the respective line lamp on each of the telephone sets in the group flashes, but the responsibility for answering the call rests solely with the clerk at the particular set whose ringer is activated for that call. Each station, after handling a call, has its ringer locked out against signaling on further calls until all stations have handled a call in the sequence, at which point all stations are released for another cycle of answering. In the event of simultaneous calls, that is when a second call is received before the first has been answered, one of the calls is automatically advanced to cause a second station to be rung as the other is answered at the "ringing" station.

A feature of the invention is means for advancing the station ringing path to the next station in the sequence chain each time a call is answered whereby call distribution is accomplished solely by sequence signaling.

A further feature of the invention is means for automatically advancing the ringing signal for a second one of simultaneously received calls to the next station in the sequence as the first call is being answered at the "ringing" station.

Figure 2:
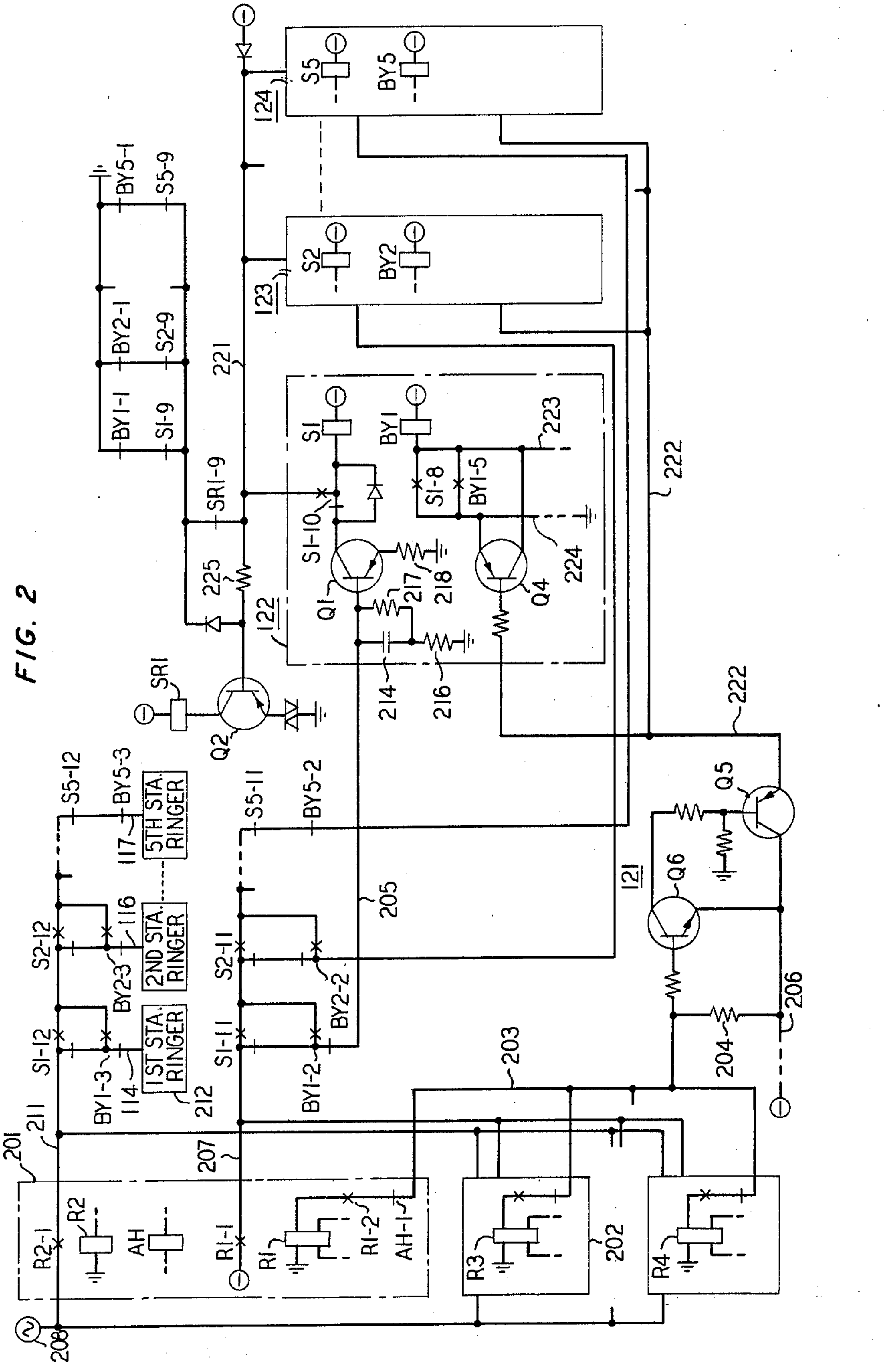

A full understanding of the arrangement contemplated by the present invention as well as an appreciation of the various advantageous features thereof may be gained from consideration of the following detailed description in connection with the accompanying drawing in which:

FIG. 1 shows schematically the arrangement and relationship of the basic individual circuits which comprise one specific illustrative embodiment of the call distributing arrangement contemplated by our invention; and FIG. 2 shows in greater detail the ringing and control circuits associated with the call-answering stations.

GENERAL DESCRIPTION

The arrangement and operation of the various components of the illustrative embodiment of our invention will be described in detail subsequently with reference to FIG. 2. However, in order to first gain a general overall understanding of the arrangement contemplated, a brief general description will be given at this point with reference to FIG. 1. Referring, therefore, to FIG. 1, the first, 101, second, 102, and last, 103, of a group of six telephone sets are shown, these telephone sets being located outside the PBX and being connected thereto in the usual manner over suitable types of lines including local lines, toll lines, tie lines and the like. The PBX switching equipment, represented in part by rectangle 104, includes a PBX line circuit connectable to each telephone set on an incoming call, each line circuit including in turn a line relay, as relays R1, R3 and R4.

A telephone set is provided for each of the information clerks at the PBX, it being assumed that five such telephone sets are provided for the group of clerks, three of which telephone sets 106, 107 and 108, are shown. Each of the lines, as lines 111, 112, 113, is terminated on each of the five PBX telephone sets in the usual manner common to key telephone sets. Each of the five telephone sets is provided with a ringer, or other audible signal of suitable type, each ringer being controlled over an individual ringing lead, as leads 114, 116 and 117.

The overall arrangement of the PBX line circuits and associated equipment may be in general accordance with the disclosure of Patent 2,850,579, issued Sept. 2, 1958 to H. T. Carter.

Common control equipment provided at the PBX and represented by rectangle 118 includes transistor circuit 121, which is common to all the PBX line circuits and to all five telephone sets, and a station control circuit individual to each of the five telephone sets, as control circuits 122, 123 and 124.

It will be assumed now for purposes of further general description that a call from telephone set 101, received over line 111, is being handled by the clerk assigned to telephone set 106, and that, in the meantime, a second call is received over line 112 from telephone set 102; it will be assumed, further, that all telephone sets of the group of five PBX telephone sets with the exception of set 106 are in idle condition.

As the second call is received over line 112, the corresponding line lamps on all five of the PBX telephone sets flash to indicate the incoming call. However, due to the operation of the novel station control circuits, which operation will be described subsequently with reference to FIG. 2, only the ringer of telephone set 107 will be activated; telephone set 107 is the "next" idle set in the chain of five sets at this time. The call incoming on line 112 will be handled by the clerk assigned to telephone set 107 as it is understood that sole responsibility for handling a particular call rests with the attendant at the "ringing" telephone set.

Through operation of the novel control circuits, as will be subsequently described in detail, the ringing leads are successively closed so that, when the next call comes in, only the ringer of the next idle set in the chain will be activated even though the line lamps on all the sets are flashed. This successive assignment of calls through ringer control continues until all the telephone sets of the group have handled a call after which a common holding ground is removed and all the station circuits restore to normal condition for start of a second sequence of operations.

Novel means are provided, including particularly portions of common transistor circuit 121, whereby in the event of simultaneous calls, one of the calls is automatically moved on to the next line while the other call is being answered at the "ringing" station in the usual manner. If more than one additional call is involved, the automatic "advance" continues until all the additional calls have been assigned.

DETAILED DESCRIPTION

A more detailed description of the contemplated arrangement will now be given, reference being made particularly to FIG. 2. The circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each relay contact is suitably designated to indicate the relay winding by which it is controlled. In accord with usual circuit design, transfer contact pairs may be either Early Make-Break (continuity) or Early Break-Make (sequence transfer) as dictated by the particular circuit operational requirements.

The PBX line circuit No. 1 is represented by rectangle 201 and PBX line circuit No. 2 by rectangle 202; as pointed out above, these circuits may be in general accordance with the arrangement disclosed in Patent 2,850,579, issued Sept. 2, 1958 to H. T. Carter.

INCOMING CALL RECEIVED

Assuming now that an incoming call is received over line 111 and that PBX line 201 is assigned to handle the call, relays R1 and R2 will be operated through the normal action of the line circuit as described in the Carter patent just referred to.

Relay R1, upon operating, locks from ground through its upper winding, make contact R1–2, break contact AH–1, lead 203, resistor 204, lead 206 to battery. Also relay R1, operated, applies battery to common lead 207 through its make contact R1–1.

Relay R2, upon operating, supplies ringing potential from source 208 to common ringing lead 211 through make contact R2–1. The ringing potential applied to line 211 will be applied in turn to the ringer of the first station in the sequence chain whose S- and BY-relays are in released position. It will be assumed that the ringing potential is applied through the break contacts of respective transfer pairs S1–12 and BY1–3 over ringing lead 114 to ringer 212 which is associated with telephone set 106. The call will be answered therefore by the clerk at the "ringing" station 106.

When the potential is first applied to common lead 207 through make contact R1–1, it is applied through the break contacts of respective transfer pairs S1–11 and BY1–2 to lead 205 and connected thereover to the base of transistor Q1 which is included in station control circuit 122 of telephone set 106. Transistor Q1 is held in OFF condition by this potential and capacitor 214 is charged to the value of the potential source through resistor 216. Relay S1 does not operate at this point since transistor Q1 is held in OFF condition.

CALL ANSWERED—RINGING PATH ADVANCED

Now when the call is answered by the first station as mentioned above, relay AH operates as a normal step in the functioning of the PBX line circuit. Relay AH, operated, interrupts at break contact AH–1 the holding path of relay R1 and the relay releases. Relay R1, released, removes the battery potential from the base of transistor Q1. Transistor Q1 is now switched to ON, the forward bias being provided through discharge of capacitor 214, and relay S1 operates from battery, winding of relay S1, break contact of transfer pair S1–10, transistor Q1, resistor 218 to ground. Relay S1, upon operating, locks through the make contact of its transfer pair S1–10 to ground on lead 221, this ground being supplied through break contact SR1–9 and a path through break contacts of released BY- and S-relays, for example, a path through break contacts BY2–1 and S2–9.

Also, relay S1, upon operating, closes through its make contact S1–8 an obvious operate path for relay BY1 with operates and locks through its make contact BY1–5 to ground supplied through lead 224 which includes the first station switchhook contacts. Accordingly, this locking path is released after answering of a call when the station set is released and the switchhook contacts reopened. Lead 223 is also connected to the individual station and particularly to various keys thereon for purposes which need not be described herein.

Through operation of relays S1 and BY1 as just described, the ringing path for the next incoming call is advanced to the next free telephone in the sequence. Thus, as the next call is received, the ringer of telephone set 107 will be activated by the ringing potential on lead 211 through the make contact of transfer pair S1–12 and the break contacts of transfer pairs S2–12 and BY2–3 to lead 116. When this next call is answered, relays S2 and BY2 will operate whereby to advance the ringing path to the next set in the sequence.

STATIONS RELEASED—ANSWERING RECYCLE

The above sequence signaling continues until a call has been answered by the fifth (last) telephone set in the answering group, the ringer of that station having been activated by the ringing potential applied through break contacts S5–12 and BY5–3 to lead 117. As the call is answered, relays S5 and BY5 of the station control circuit operate.

As the successive pairs of station relays S1–BY1; S2–BY2; S5–BY5; operated, the S- relay in each instance locked to the ground on lead 221 which ground was applied through break contacts of released pairs of BY- and S-relays. However, as the last station relays in the sequence, that is, relays S5 and BY5, operate, the last ground path, that is, the path through break contacts BY5–1 and S5–9, is interrupted and the shunt is removed from the base of transistor Q2. The full holding current for the S1–S5 relays is now drawn from the emitter of transistor Q2; this flow of current turns the transistor ON and relay SR1 operates.

Relay SR1, operated, removes at break contact SR1–9, the shunt around resistor 225, and connects this resistor effectively in series with the base of transistor Q2. This increased resistance in the path reduces the holding current supplied to the S1–S5 relays sufficiently to cause release of these relays. As the station relays release, the ground paths through contact pairs, as BY1–1, S1–9, are reestablished and transistor Q2 turns OFF and releases relay SR1. The station circuits are now restored to normal for the next cycle of sequential ringing.

SIMULTANEOUS CALLS

It may well happen, particularly during the busier periods of the day, that there will be an occurrence of "simultaneous calls," that is, the receipt of a second call before a first call has been answered at the ringing station. In such instance it is, of course, necessary for efficient operation of the system that, as the first call is answered at the "ringing" station, the ringing path be advanced to the next station in the usual manner rather than being held closed to the first station by the potential applied over common lead 207 to the transistor of the respective station control circuit. Automatic advance of the ringing paths so long as more than one unanswered call prevails is provided by the novel circuit arrangement contemplated by our invention.

Assuming for purposes of description that relay R1 has operated and locked up on a first incoming call, yet unanswered, and that a second PBX line circuit relay, R3, has operated and locked up on a second incoming call, also yet unanswered, the ringer at telephone set 106 will be activated as previously described.

All operated PBX line relays, as R1, R3 and R4, obtain their holding potential over common lead 203, resistor 204 being included in this path. When only one relay is operated at a time the voltage drop across resistor 204 is not of sufficient magnitude to affect transistor Q6. However, in the assumed instance where both relays R1 and R3 are drawing holding potential, the voltage drop across resistor 204 is sufficient that transistor Q6 is turned ON; this in turn supplies biasing potential to the base of transistor Q5 whereby to turn that transistor ON.

Battery potential is now supplied through transistor Q5 and over common lead 222 to the base of transistor Q4 as well as to respective bases of the corresponding transistors of the other station control circuits. With transistor Q4 ON, relay BY1 operates from battery, winding of relay BY1, lead 223, transistor Q4 to the ground on lead 224 supplied by the respective station circuit. Relay BY1 upon operating locks to this same ground through its make contact BY1–5.

Relay BY1, operated, advances the ringing path through the make contact of its transfer pair BY1–3 to the next station, and, since the potential is removed from lead 205 at the break contact of transfer pair BY1–2, the operation of relay BY1 also results in transistor Q1 turning ON and relay S1 operating. The "second" call is, therefore, automatically advanced to telephone set 107 while the first is being answered at the first "ringing" set 106.

The above advancement will continue so long as simultaneous calls persist and more than one PBX line relay (as R1, R3) are locked up at the same time. the BY-relays of the respective stations will operate through the respective ON transistor (corresponding to Q4) to the ground supplied by the respective station circuit. However, when only a single PBX line relay remains locked up, transistor Q6 will be turned OFF; transistor Q5 will turn OFF in turn and the forward biasing potential will be removed from lead 222.

It will be readily apparent from the above description that the arrangement contemplated by our invention provides efficient call distribution service at a desirably low cost since the only actual switching involved is that of advancing the respective ringing paths in sequence as each call is answered. It does, however, offer the equitable distribution of calls previously available only in more expensive systems since no attendant is called upon to handle a "second" call until all the other attendants in the sequence have handled their "first" calls.

It is to be understood that the above described arrangement is illustrative of the principles of the invention. Numerous other arrangements may be devised by those skilled in the art without departing from the spirit and scope of the invention.

What is claimed is:

1. In a telephone system, a plurality of incoming lines, a plurality of station sets arranged in a sequential group, means for connecting said incoming lines to said station sets, a calling signal means having an energizing path associated with each of said station sets, and means effective upon a call on one of said incoming lines being answered at one of said station sets for closing the calling signal energizing path at the next station set in the sequential group whereby the calling signal means associated with that station set will be activated upon receipt of the next subsequent call, said signal energizing path closing means including a first station set relay having a break contact included in the calling signal energizing path of said one of said station sets and having a make contact included in said calling signal energizing path of said next station set and means effective upon the call being answered at said one of said station sets for operating said first station set relay.

2. In a telephone system the combination defined by claim 1 further characterized in that said means for operating said first station set relay includes a transistor connected in the operate path of said first station set relay, means for holding said transistor in OFF condition, and means effective when the call is answered for switching the transistor to ON condition.

3. In a telephone system the combination defined by claim 2 further characterized in a second station set relay associated respectively with each of said station sets, each of said second station set relays having a break contact connected in the calling signal energizing path of the respectively associated station set and having a make contact included in the signal energizing path of the respective next station set in the sequential group.

4. In a telephone system the combination defined by claim 3 further characterized in a holding path for each of said first station set relays, a common holding ground connection for all of said holding paths, and means effective upon all of said first station set relays being locked operated for interrupting the connection to said common holding ground whereby to release all said first station set relays.

5. In a telephone system the combination defined by claim 3 further characterized in a first and a second operate path for each of said second station set relays, and means controlled by operation of the respectively associated first station set relay for closing the first operate path of each respective second station set relay.

6. In a telephone system the combination defined by claim 5 further characterized in transistor means included in the second operate path of each respective second station set relay and common control means for all of said transistor means.

7. In a telephone system the combination defined by claim 5 further characterized in a line relay associated with each of said incoming lines and operated when a call is received on the respective line, a holding winding for each of said line relays and a common path for supplying holding potential to all of said line relays in operated position.

8. In a telephone system the combination defined by claim 7 further characterized in a resistor included in said common potential supplying path and a transistor connected to said resistor whereby the potential drop developed across said resistor is applied to the base of said transistor.

9. In a telephone system the combination defined by claim 8 further characterized in transistor means included in the second operate path of each respective station set relay and means including said resistor and said transistor connected thereto and effective when two of said line relays are operated simultaneously for activating said transistor means to close the second operate path of each respective second station set relay whereby to operate said second station set relays.

10. In a telephone system, a plurality of incoming lines, a plurality of station sets arranged in a sequential group, means for connecting said incoming lines to said station sets, calling signal means having an energizing path associated with each of said station sets, means effective upon a call on one of said incoming lines being answered at one of said station sets for closing the calling signal means energizing path at the next station set in the sequential group whereby the calling signal associated with that station set will be activated upon receipt of the next subsequent call, and means effective upon a second call being received over another of said incoming lines before a first call has been answered in response to an activated calling signal means at one of said station sets for closing the calling signal means energizing path associated with the respective next station set in the sequential group whereby to activate the calling signal means at that station.

No references cited.

KATHLEEN H. CLAFFY, Primary Examiner

T. W. BROWN, Assistant Examiner